US010789050B2

(12) United States Patent
Kendai et al.

(10) Patent No.: US 10,789,050 B2
(45) Date of Patent: Sep. 29, 2020

(54) STAGE FILE OBJECTS IN A VISUAL DESIGN TOOL FOR INTEGRATION DEVELOPMENT

(71) Applicant: Oracle International Corporation, Redwood Shores, CA (US)

(72) Inventors: Vijay Kendai, Aurora, CO (US); Greg Gravenites, Littleton, CO (US); Rajan Mahendrakumar Modi, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 432 days.

(21) Appl. No.: 15/706,284

(22) Filed: Sep. 15, 2017

(65) Prior Publication Data

US 2018/0081895 A1    Mar. 22, 2018

Related U.S. Application Data

(60) Provisional application No. 62/396,064, filed on Sep. 16, 2016, provisional application No. 62/510,979, filed on May 25, 2017.

(51) Int. Cl.
*G06F 8/34*        (2018.01)
*G06F 8/71*        (2018.01)
(Continued)

(52) U.S. Cl.
CPC .................. *G06F 8/34* (2013.01); *G06F 8/24* (2013.01); *G06F 8/65* (2013.01); *G06F 8/71* (2013.01);
(Continued)

(58) Field of Classification Search
CPC ..... G06F 8/34; G06F 8/71; G06F 8/65; G06F 8/24; G06F 16/23; G06F 16/168; G06F 16/13; G06F 16/11
See application file for complete search history.

(56) References Cited

U.S. PATENT DOCUMENTS 6,208,345 B1    3/2001  Sheard et al.
6,738,975 B1    5/2004  Yee et al.
(Continued)

FOREIGN PATENT DOCUMENTS

WO    0221314       3/2002
WO    2006026686    3/2006

OTHER PUBLICATIONS

Authoring SharePoint Workflows in Visual Studio 2005, Available online at https://msdn.microsoft.com/en-us/library/office/aa830816(v=office.12).aspx#office2007ssintrotoworkflows_authsharepointworkflowsinvs2005, 2005, 3 pages.
(Continued)

*Primary Examiner* — Huawen A Peng
(74) *Attorney, Agent, or Firm* — Kilpatrick Townsend & Stockton LLP

(57) ABSTRACT

Described herein are systems and methods for providing stage file objects in a visual design tool for integration development. The integration can be developed on a cloud based integration service that can receive, via a visual development tool interface, selection of a stage file object for insertion into an integration flow. The cloud based integration service can also receive a selection of a type value for the stage file object. The scope for the stage file object can be determined, and the stage file object can be displayed in the integration flow based on the type value and the scope.

20 Claims, 16 Drawing Sheets

(51) Int. Cl.

| | | |
|---|---|---|
| *G06F 8/20* | (2018.01) | |
| *G06F 8/65* | (2018.01) | |
| *G06F 16/11* | (2019.01) | |
| *G06F 16/13* | (2019.01) | |
| *G06F 16/23* | (2019.01) | |
| *G06F 16/16* | (2019.01) | |
| *G06F 3/0482* | (2013.01) | |

(52) U.S. Cl.
CPC .............. *G06F 16/11* (2019.01); *G06F 16/13* (2019.01); *G06F 16/168* (2019.01); *G06F 16/23* (2019.01); *G06F 3/0482* (2013.01)

(56) References Cited

U.S. PATENT DOCUMENTS

| | | | |
|---|---|---|---|
| 7,174,370 | B1 | 2/2007 | Saini et al. |
| 7,496,887 | B2 | 2/2009 | Grasselt et al. |
| 7,844,911 | B2 | 11/2010 | Austin et al. |
| 8,332,806 | B2 | 12/2012 | Patrascu et al. |
| 8,413,115 | B1 | 4/2013 | Surprise et al. |
| 8,683,443 | B2 | 3/2014 | Hatton et al. |
| 2004/0044986 | A1 | 3/2004 | Kompalli et al. |
| 2006/0053408 | A1 | 3/2006 | Kornerup et al. |
| 2007/0044072 | A1 | 2/2007 | Hayles |
| 2008/0059436 | A1 | 3/2008 | Crocker |
| 2008/0270977 | A1 | 10/2008 | Nucci et al. |
| 2009/0132506 | A1 | 5/2009 | Houck et al. |
| 2010/0011309 | A1 | 1/2010 | Mitra et al. |
| 2010/0199257 | A1* | 8/2010 | Biggerstaff ............. G06F 8/456 717/104 |
| 2011/0161920 | A1 | 6/2011 | Alexander et al. |
| 2011/0191753 | A1 | 8/2011 | Ghercioiu et al. |
| 2011/0246961 | A1 | 10/2011 | Tripathi |
| 2013/0055233 | A1* | 2/2013 | Hatton ..................... G06F 8/71 717/170 |
| 2013/0093771 | A1 | 4/2013 | Simitsis et al. |
| 2013/0166963 | A1 | 6/2013 | Stoyanov |
| 2013/0290980 | A1 | 10/2013 | Kemp et al. |
| 2014/0240754 | A1 | 8/2014 | Smyth et al. |
| 2014/0282364 | A1 | 9/2014 | Woodward |
| 2016/0182652 | A1 | 6/2016 | Bevilacqua et al. |
| 2016/0359689 | A1 | 12/2016 | Herreria et al. |
| 2016/0378274 | A1 | 12/2016 | Akiner et al. |
| 2017/0257429 | A1 | 9/2017 | Hosie et al. |
| 2018/0081643 | A1 | 3/2018 | Gravenites et al. |
| 2018/0081739 | A1 | 3/2018 | Gravenites et al. |
| 2018/0081895 | A1 | 3/2018 | Kendai et al. |

OTHER PUBLICATIONS

Building a Workflow—Drip Knowledge Base, Available online at http://kb.getdrip.com/email-automation/workflows/building-a-workflow/, accessed from internet on May 10, 2017, 10 pages.
Hybrid Integration Platform for Cloud, SaaS & IoT, Available online at https://www.robomq.io/, 2017, 17 pages.
Integration Flow Designer, Available online at https://www.robomq.io/products/flow.html, 2017, 8 pages.
SAP Cloud Platform Integration, Available online at https://cloudplatform.sap.com/capabilities/integration/cloud-integration.html#, accessed from internet on May 9, 2017, 6 pages.
Simple Marketing Automation Workflows by Drip, Available online at https://www.drip.co/workflows, 2017, 6 pages.
Danila et al., Change Impact Analysis in WS-BPEL Processes, U.P.B. Sci. Bull., Series C, vol. 77, Iss. 2, 2015, pp. 123-136.
Wang et al., Change Impact Analysis in Service-Based Business Processes, Service Oriented Computing and Applications, vol. 6, 2012, pp. 131-149.
U.S. Appl. No. 15/706,269, Notice of Allowance dated Oct. 31, 2018, 10 pages.
U.S. Appl. No. 15/705,901, Non-Final Office Action dated Dec. 31, 2018, 10 pages.

* cited by examiner

STAGE FILE OBJECTS IN A VISUAL DESIGN TOOL FOR INTEGRATION DEVELOPMENT

CROSS-REFERENCES TO RELATED APPLICATIONS

This application claims priority to U.S. Provisional Application No. 62/396,064 filed on Sep. 16, 2016 in the United States Patent and Trademark Office, entitled "CLOUD SERVICE ORCHESTRATION" and U.S. Provisional Patent Application No. 62/510,979 filed on May 25, 2017 in the United States Patent and Trademark Office, entitled "INTEGRATION CLOUD SERVICE," the disclosures of which are incorporated by reference herein in their entirety.

BACKGROUND

A user may have one or more applications that they would like to integrate. Data or functions from a first application may be combined with data or functions of a second application. For example, the user of a marketing application may desire to use information from a human resources application. In another example, a new sales application may want to incorporate data from an old sales application. Instead of transferring or copying all of the data from the first application to the second application, the applications can be integrated. This would allow the second application to access and use data or functions from the first application more easily.

The integration can be done through the creation of an integration flow. An integration flow can define, for example, the collection of data from a first system, activities performed on the data (e.g., formatting of the data to be compatible with the second system), and distribution of the data to the second system.

During the creation of an integration flow, an integration developer may want to perform one or more actions involving files. Because the cloud based integration service is accessing multiple systems, performing these actions cannot be done through standard external calls to the systems. Further, the files can include hundreds of thousands of records. The time to process such a large amount of data can be enormous. Accordingly, improvements are needed to allow more complex processing and to perform the processing more quickly.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can include a cloud based integration service that can receive, via a visual development tool interface, selection of a stage file object for insertion into an integration flow. The cloud based integration service can also receive, via the visual development tool interface, selection of a type value for the stage file object. The cloud based integration service can also determine, based on the type value, a scope of the stage file object. The cloud based integration service can also display, via the visual development tool interface, the stage file object in the integration flow based on the type value and the scope. Other embodiments of this aspect include corresponding computer systems, apparatus, and computer programs recorded on one or more computer storage devices, each configured to perform the actions of the methods.

Implementations may include one or more of the following features. Optionally, the type value defines the stage file object as a stage file read action. The cloud based integration service can display, via the visual development tool interface, a chunking box associated with the stage file object visually defining the scope. The cloud based integration service can receive, via the visual development tool interface, selection of a processing object and an insertion point in the integration flow, where the insertion point is within the chunking box. The cloud based integration service can configure the processing object to be within the scope of the stage file object. The cloud based integration service can update display of the visual development tool interface to include the processing object within the chunking box. The cloud based integration service can provide, via the visual development tool interface, an input configuration screen including a selectable list of objects, where the selectable list of objects includes each object in the integration flow having an output that can be used as an input to the processing object, and where the stage file object is in the selectable list of objects. Optionally, the cloud based integration service can receive, via the visual development tool interface, selection of a second processing object and a second insertion point, where the second insertion point follows a location of the stage file object in the integration flow and is not within the scope of the chunking box. The cloud based integration service can provide, via the visual development tool interface, an input configuration screen including a selectable list of objects, where the selectable list of objects includes each object in the integration flow having an output that can be used as an input to the second processing object, and where the stage file object is not in the selectable list of objects.

Optionally, the type value can define the stage file object as a stage file read action. The cloud based integration service can receive, via the visual development tool interface, a configuration value for the stage file object that disables chunking. The cloud based integration service can receive, via the visual development tool interface, selection of a processing object, selection of an insertion point following the stage file object in the integration flow, and selection of the stage file object as an input to the processing object.

Optionally, the type value can define the stage file object as a stage file write action. The cloud based integration service can receive, via the visual development tool interface, selection of a processing object, selection of an insertion point following the stage file object in the integration flow, and selection of the stage file object as an input to the processing object.

Optionally, the type value can define the stage file object as a stage file zip action. The cloud based integration service can receive, via the visual development tool interface, selection of a processing object, selection of an insertion point following the stage file object in the integration flow, and selection of the stage file object as an input to the processing object.

Optionally, the type value can define the stage file object as a stage file list action. The cloud based integration service can receive, via the visual development tool interface, selection of a processing object, selection of an insertion point following the stage file object in the integration flow, and selection of the stage file object as an input to the processing object. Implementations of the described techniques may include hardware, a method or process, or computer software on a computer-accessible medium.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

In accordance with an example embodiment, techniques are disclosed for the visual illustration of stage file objects in an integration flow in cloud based integration services during, such as Integration Cloud Service (ICS), during design time. Embodiments include stage file objects that provide visualization for a developer to create portions of the integration to process a file in parallel for resource optimization. A stage file object can define a stage file action, which can be a tool for the developer to perform processing on a file in a staged location during runtime (i.e., execution of the integration flow). The staged location can be a virtual location, created during runtime, that only the cloud based integration service can access. A stage file action can define a scope visually for a developer to utilize for easily implementing the parallel processing that can be used during runtime. The stage file action can include a type value (e.g., stage file read, stage file write, stage file zip, and/or stage file zip) and a scope. The type value and the scope can be visually depicted in the visual design tool.

Figure 1:
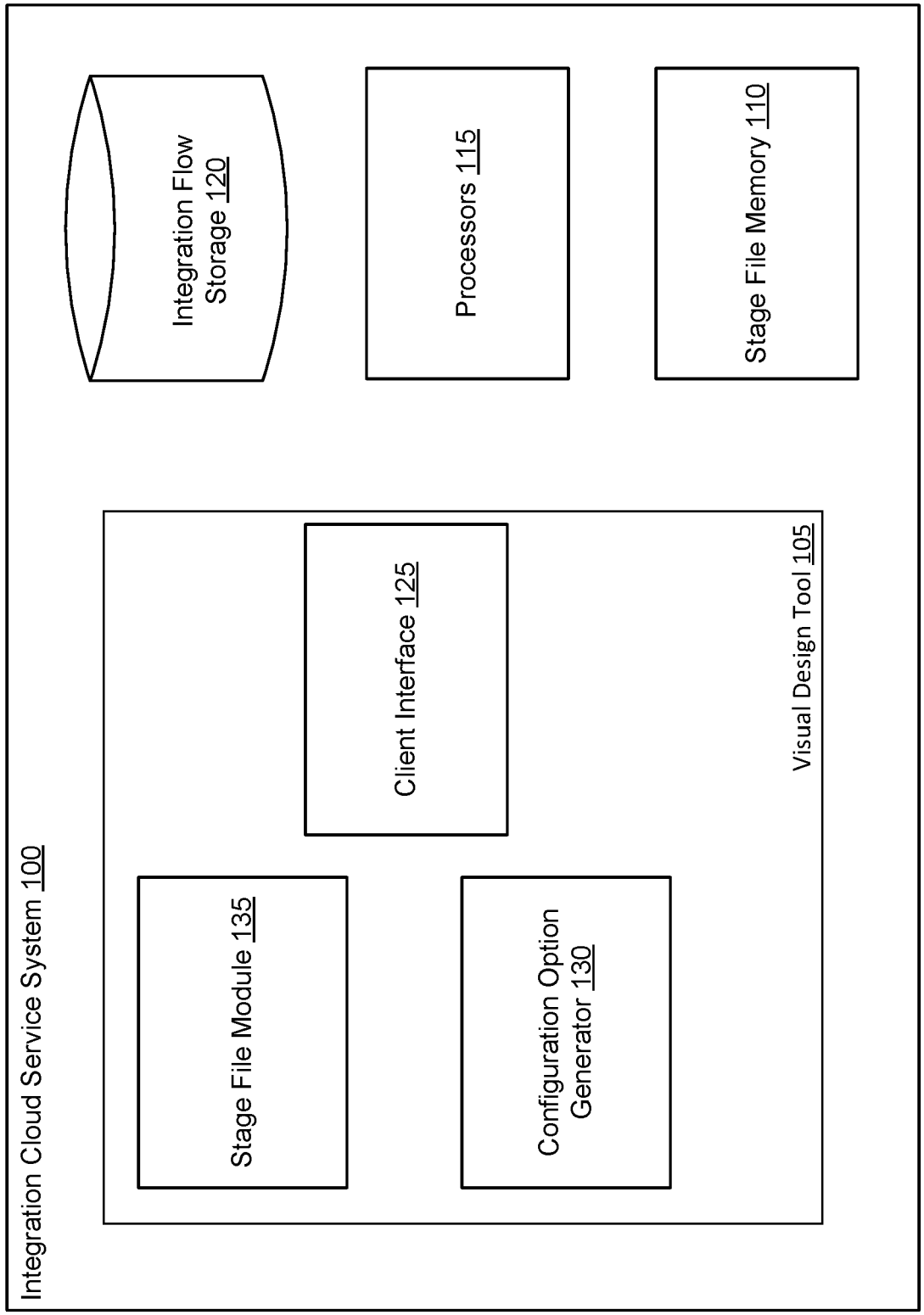
FIG. 1 illustrates an integration cloud service system according to some example embodiments.

FIG. 1 illustrates a simplified block diagram of an integration cloud service system 100. The integration cloud service system can be a cloud based integration service that allows a user to integrate one or more applications. The applications can be integrated so that information from one can be made available to the other without having to copy all of the data from one application to the other application. The integration cloud service system 100 can be a cloud based system as described with respect to FIG. 12. The integration cloud service system 100 can include hardware and software components that are not depicted for the ease of description herein. For example the integration cloud service system can include one or more computer systems and multiple databases. Integration cloud service system 100 can include a visual design tool 105, an integration flow storage 120, processors 115, and stage file memory 110.

Visual design tool 105 can be a development tool used by developers to create integration flows. The integration flows can be executed to integrate applications as defined in the integration flow. For example, the visual design tool can be used to create an integration flow that, when executed can obtaining data from a first application, map the data to other data from a second application, and provide an enhanced dataset for processing in a third application. The visual design tool 105 can include a stage file module 135, a configuration option generator 130, and a client interface 125. Visual design tool 105 can include many other modules that provide functionality not described herein such as, for example, error handling. While three modules, stage file module 135, configuration option generator 130, and client interface 125, are described and depicted, visual design tool 105 can have any number of modules. Features described within a module can also be combined into other modules or separated into a different module without affecting the scope of the description. The visual design tool 105 can be computer instructions stored on a memory device within integration cloud service system 100. The instructions can be executed by a processor (e.g., processors 115) to provide the functionality described herein and specifically to provide the visual design tool 105.

Client interface 125 can provide a user interface (i.e., visual design tool interface) to the user (e.g., an integration developer) of the visual design tool. Some example embodiment visual design tool interfaces are provided in FIGS. 5, 6, 7, 8, 9, and 10. Client interface 125 can generate the visual design tool interface for display on a display device (not pictured) on integration cloud service system 100. Client interface 125 can also receive inputs entered via the visual design tool interface by the user and direct the inputs to the appropriate module (e.g., stage file module 135).

Stage file module 135 can provide the stage file object for use in client interface 125. Stage file module 135 can receive configuration options for the stage file object from client interface 125 that define the stage file action to be performed at runtime. Stage file module 135 can, using the configuration options, provide the proper display for client interface 125 to provide in the visual design tool interface to the user.

For example, the visual depiction of the stage file object differs based on the stage file action. The stage file action can be a stage file read action, a stage file write action, a stage file list action, or a stage file zip action. Each type of stage file action has a differing visual depiction. Further, the visual depiction of the stage file object differs based on whether chunking is enabled for the stage file action. Stage file module 135 can determine, based on the configuration options, the proper visualization of the stage file object in the integration flow and provide the proper visualization to client interface 125 for display in the visual design tool interface. Stage file module 135 can be invoked as, for example, a function call from client interface 125 that provides as parameters the stage file object configuration information selected by the user.

Configuration option generator 130 can, during development of an integration flow, limit the configuration options for an object in the integration flow based on the structure of the integration flow. For example, a first object in the integration flow cannot use a second object that follows the first object in the integration flow as an input to the first object. The second object cannot be the input to the first object because, during execution of the integration flow, the action defined by the second object has not yet been performed (i.e., executed) in the integration flow and therefore cannot be the input to the first object. Configuration option generator 130 can analyze the structure of the integration flow and determine the available configuration options for a configuration parameter of an object in the integration flow. The available configuration options can be provided to client interface 125 for display and use in the visual design tool interface. Configuration option generator 130 can be invoked as, for example, a function call from client interface 125 that provides as parameters the object for configuration and its position in the integration flow. Based on the specific object and its location in the integration flow, the configuration option generator 130 can then generate available configuration options for each configuration parameter for the object. For example, the configuration option generator 130 can generate a selectable list of input options that are available to the object. The configuration option generator 130 can provide the available configuration options to the client interface 125 for display in the visual design tool interface to the user.

Optionally, the configuration option generator 130 can maintain the available configuration options for each object in the integration flow by, for example, storing the available configuration options in memory (e.g., RAM) for later use by the visual design tool 105 without having to regenerate the list of available options each time the user selects an object to configure. Optionally, the visual design tool 105 can invoke the configuration option generator 130 each time a configuration parameter for any object in the integration flow is changed to ensure the available configuration options for each object is updated.

The integration flow storage 120 can be any suitable database for storing integration flows that have been developed using the visual design tool 105. For example, upon completing an integration flow in visual design tool 105, the user can choose to save the integration flow. The visual design tool 105 can store the integration flow in the integration flow storage 120.

Figure 13:
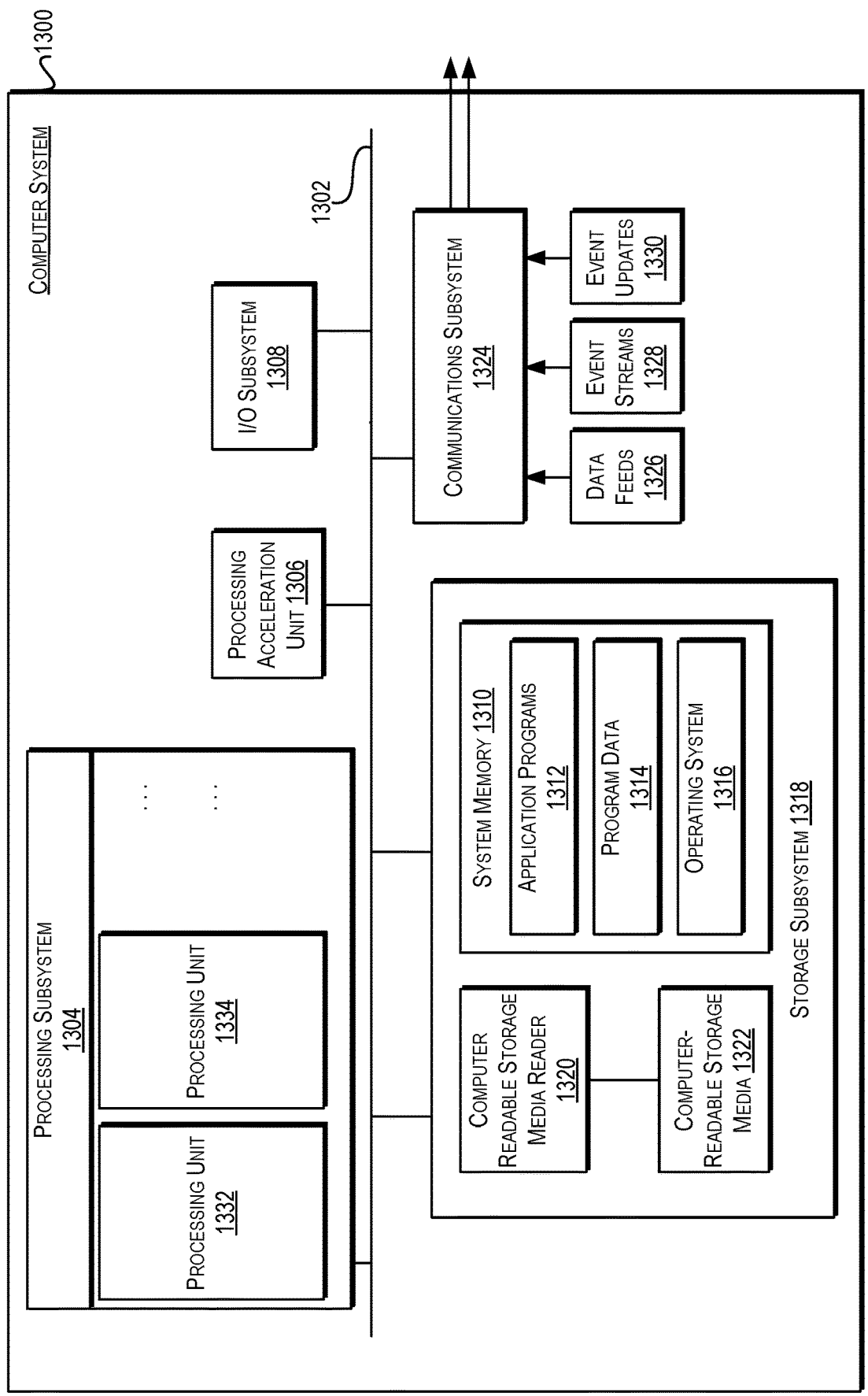
FIG. 13 illustrates a computer system that may be used to implement some of the example embodiments.

Processors 115 can be any suitable processor or processing system, such as processing subsystem 1304 or processing units 1332, 1334 as described with respect to FIG. 13. Processors 115 can be used to execute, for example, the instructions for visual design tool 105 or execute the integration flows stored in integration flow storage 120.

Stage file memory 110 can be any suitable memory, such as system memory 1310 as described with respect to FIG. 13. Stage file memory 110 can be used during runtime (i.e., execution of an integration flow) for the staged location for a stage file action defined by a stage file object.

In use, a developer can access the visual design tool 105 on integration cloud service system 100 to develop an integration flow. The developer can drag and drop a stage file object into the integration flow from an actions palette, such as stage file object 505 on actions palette 510 of FIG. 5. The client interface 125 can receive the stage file object and the insertion point into the integration flow from the visual design tool interface. The client interface 125 can also receive a type of the stage file object from the visual design tool interface. The client interface 125 can provide the stage file object, insertion point, and type to the stage file module 135. Depending on the type, the stage file module 135 can generate the visual depiction of the stage file object for display in the visual design tool interface.

Figure 9:
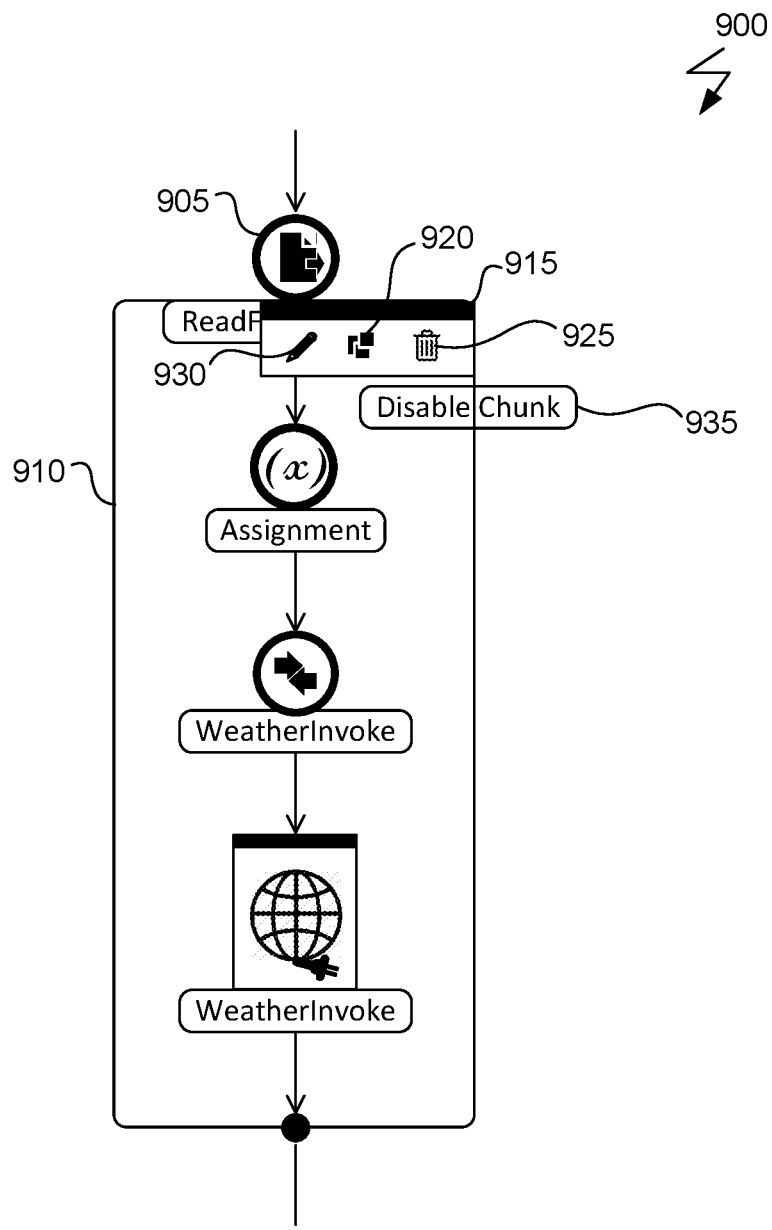
FIG. 9 illustrates a portion of a visual design tool interface including a portion of an integration flow including a stage file object with chunking enabled and a configuration menu according to some example embodiments.

In the case of a stage file read action, the user can configure parameters including, for example, an enable chunking parameter, a staged location, and a file for reading. An example visual design tool interface for entry of the configuration parameters is provided at FIG. 6. The stage file module 135 can determine whether chunking is configured to be enabled or disabled based on the enable chunking parameter. For example, the client interface 125 can send the enable chunking parameter with the stage file object. An example visual design tool interface showing a configuration menu 915 for setting configuration parameters of stage file object 905 using the enabling and disabling chunking toggle 920 is shown in FIG. 9.

A stage file read action can be different from other stage file actions, because it can present the user with different visualizations depending on whether the stage file read action is configured to enable chunking or not. By default, the user is presented with a stage file object representing a stage file read action and a visualization indicating that the data read is chunked into multiple data sets by depicting a chunking box. Stage file objects defining other stage file actions are visualized as a stage file object without a chunking box. A stage file object defining a stage file write action can provide a map action preceding the stage file object which can as a way to collect input for the stage file object.

Figure 7:
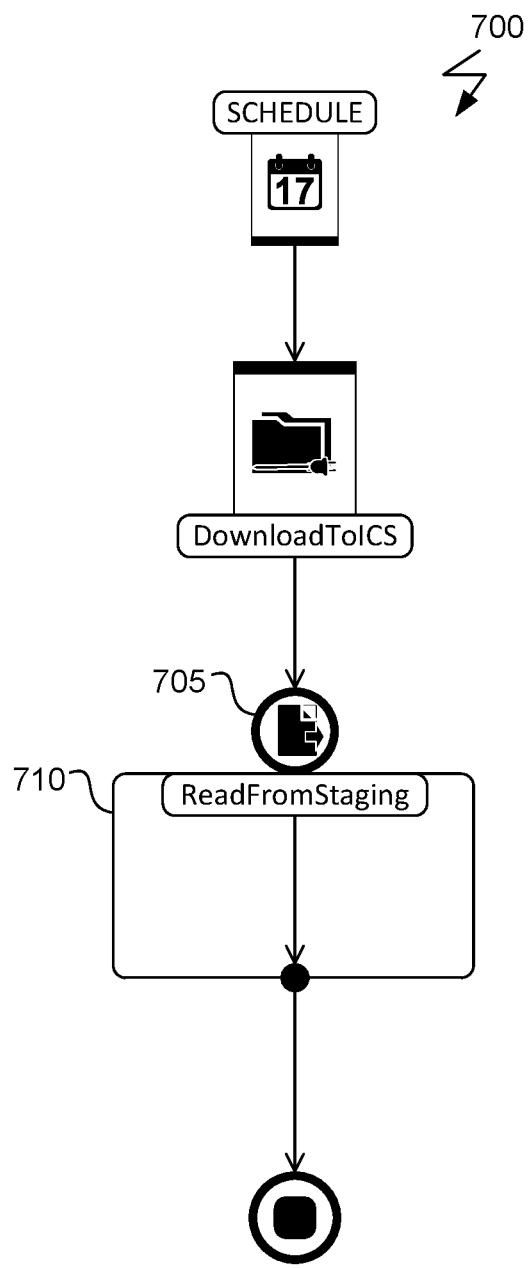
FIG. 7 illustrates a portion of a visual design tool interface including an example integration flow including a stage file object according to some example embodiments.
Figure 8:
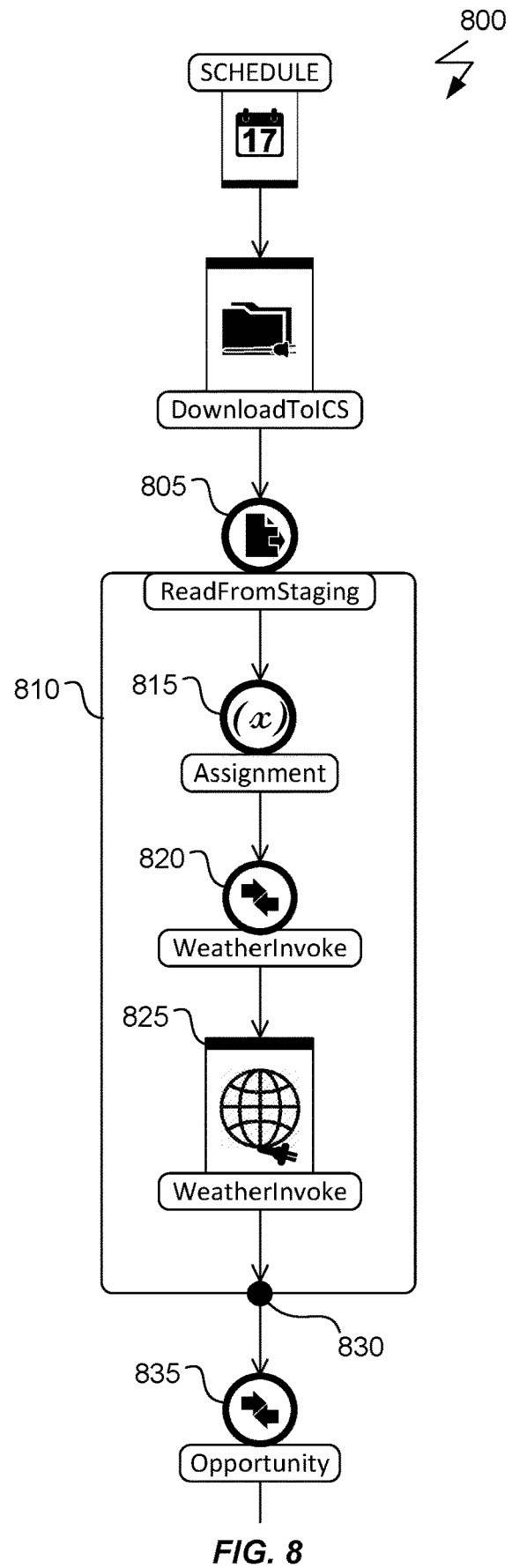
FIG. 8 illustrates a portion of a visual design tool interface including another example integration flow including a stage file object with chunking enabled according to some example embodiments.

If chunking is enabled, the stage file module 135 can configure the stage file object as depicted in FIG. 7. The chunking stage file object 705 in FIG. 7 includes a chunking box 710. The chunking box 710 visually defines a scope of the stage file object. As shown in FIG. 8, other objects 815, 820, and 825 can be dragged and dropped into the chunking box 810, which is within the scope of the stage file object. Each other object 815, 820, and 825 can be defined to perform an action on the file. The actions defined can be, for example, an assignment, a mapping, and so forth. During execution, the file can be chunked for processing on multiple processing threads in parallel in the staged location. Stated differently, multiple processes can launch during execution of the integration flow at the stage file object to read the file in chunks. For example, a file having 50,000 records can be read in 1,000 record chunks, each 1,000 record chunk being read by a separate process. The processes can execute in parallel and perform each of the actions (e.g., actions defined by other objects 815, 820, and 825) within the chunking box (e.g., chunking box 810) at the staged location. The results of each process can be merged at a merge point (e.g., merge point 830 of FIG. 8) once each of the processes have completed. During design time, the visualization of the chunking box 810 can allow the developer to visualize which actions will be performed within the scope of the stage file object at runtime. For objects within the scope of the stage file object the stage file object can be configured as an input to those objects. For objects that are not within the scope of the stage file object, the stage file object cannot be configured as an input to those objects.

Optionally, after the merge point (e.g., merge point 830 of FIG. 8), the output of the stage file read action can be unavailable as an input to a downstream object (i.e., an object following the merge point in the integration flow). For example, during integration flow development, stage file object 805 cannot be configured as the input to map object 835 in FIG. 8. When the user configures the map object 835, configuration option generator 130 can receive the map object 835 and location in the integration flow from the client interface 125. The configuration option generator 130 can determine that the stage file object 805 is not available as an input based on, for example, the chunking enabled parameter of the stage file object 805 and the location of the map object 835 after the merge point 830 in the integration flow. Upon determining that the stage file object 805 is not an available option for input to the map object 835, configuration option generator 130 can generate a selectable list of available input options for configuring map object 835 that does not include stage file object 805. Configuration option generator 130 can provide the selectable list of input options to client interface 125 for display in the visual development tool interface.

Figure 10A:
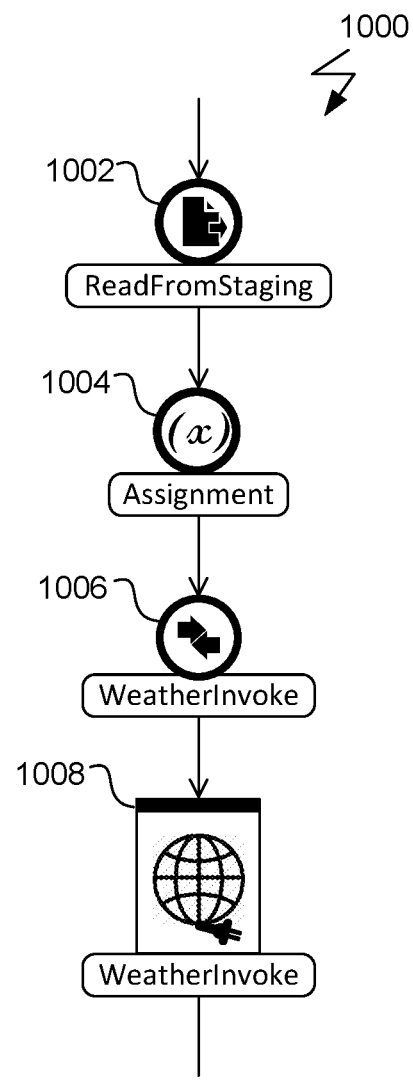
FIGS. 10A, 10B, 10C, and 10D illustrate a portion of a visual design tool interface including a portion of an integration flow including a stage file object with chunking disabled according to some example embodiments.

If chunking is not enabled, the stage file module 135 can configure the stage file object as depicted in FIG. 10A, without a chunking box. This visualization can allow the developer to see, during design time, how the stage file action will behave during runtime. For example, without a chunking box, the developer can know that the stage file object has chunking disabled and therefore will not display a visible scope. The stage file object 1002 in FIG. 10A can define a stage file read action without chunking. Objects following the stage file object 1002 in FIG. 10A, such as the invoke object 1008, can be configured to use the stage file object as an input to the invoke object 1008.

Figure 10B:
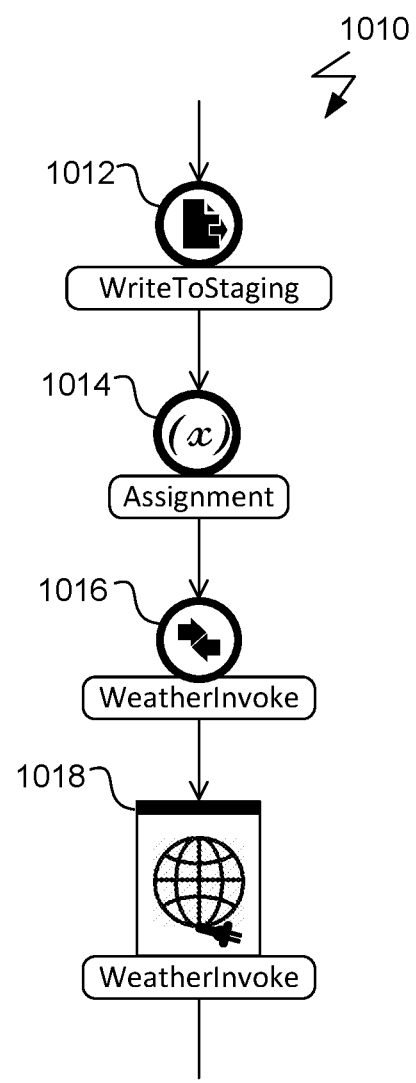

In the case of a stage file write action, the user can configure parameters including, for example, a file name and a staged location. An example visual design tool interface for entry of the configuration parameters is provided at FIG. 6. The client interface 125 can receive the parameters and selection of the stage file object and the insertion point and provide each to the stage file module 135. The stage file module can configure the stage file object as depicted in FIG. 10B. This visualization can allow the developer to see, during design time, how the stage file action will behave during runtime. Objects following the stage file object 1012 in FIG. 10B, such as the weatherinvoke object 1018, can be configured to use the stage file object as an input to the weatherinvoke object 1018.

Figure 10C:
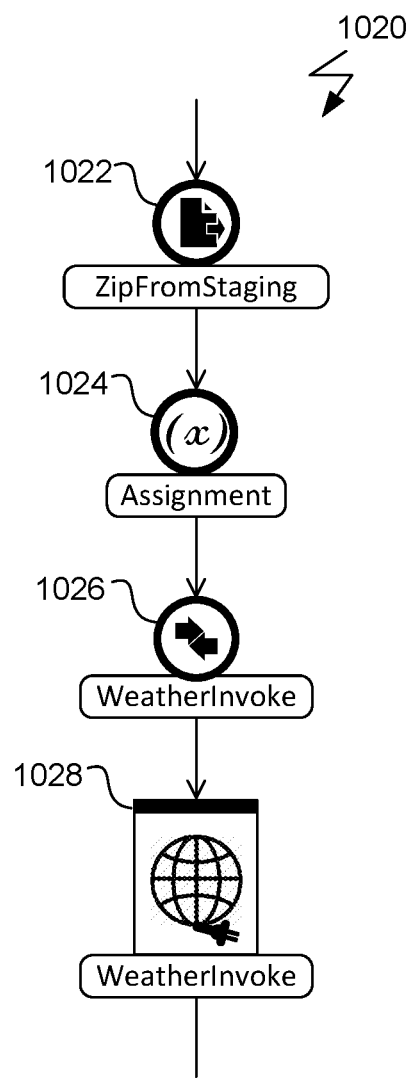

In the case of a stage file zip action, the user can configure parameters including, for example, a file name, a source directory, and a staged location. An example visual design tool interface for entry of the configuration parameters is provided at FIG. 6. The client interface 125 can receive the parameters and selection of the stage file object and the insertion point and provide each to the stage file module 135. The stage file module can configure the stage file object similar to the stage file object 1022 as depicted in FIG. 10C. This visualization can allow the developer to see, during design time, how the stage file action will behave during runtime. Objects following the stage file object 1022 in FIG. 10C, such as the weatherinvoke object 1028, can be configured to use the stage file object as an input to the weatherinvoke object 1028.

Figure 10D:
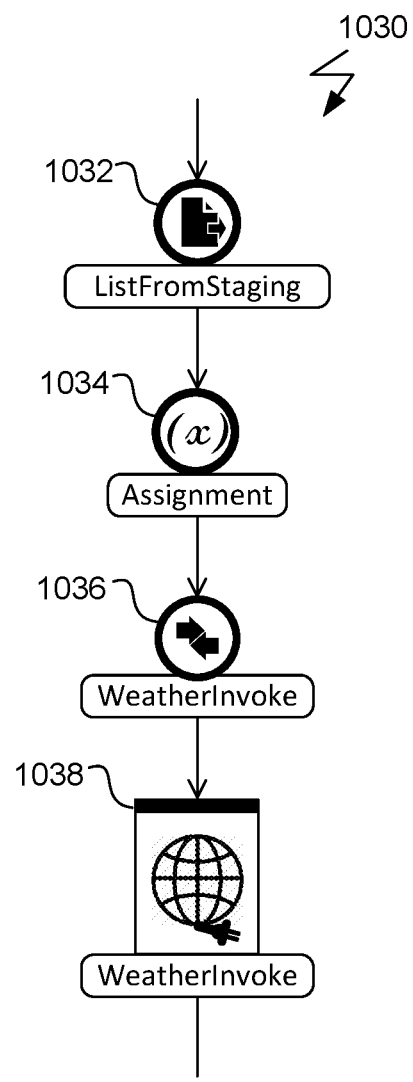

In the case of a stage file list action, the user can configure parameters including, for example, a file name, a source directory, and a staged location. An example visual design tool interface for entry of the configuration parameters is provided at FIG. 6. The client interface 125 can receive the parameters and selection of the stage file object and the insertion point and provide each to the stage file module 135. The stage file module can configure the stage file object similar to the stage file object 1032 as depicted in FIG. 10D. This visualization can allow the developer to see, during design time, how the stage file action will behave during runtime. Objects following the stage file object 1032 in FIG. 10D, such as the weatherinvoke object 1038, can be configured to use the stage file object as an input to the weatherinvoke object 1038.

Once the integration is completed to the satisfaction of the user, the visual design tool 105 can save the integration flow in the integration flow storage 120. Once stored, the integration flow can be available for execution. The integration flow can be executed by processors 115. Processors 115 can access the integration flow in integration flow storage 120. During execution, the processors 115 can perform the actions as defined by the objects in the integration flow. Specifically with respect to the stage file object, the processors 115 can create the staged location in stage file memory 110 as defined by the stage file object configuration parameters entered by the user for the staged location.

Figure 2:
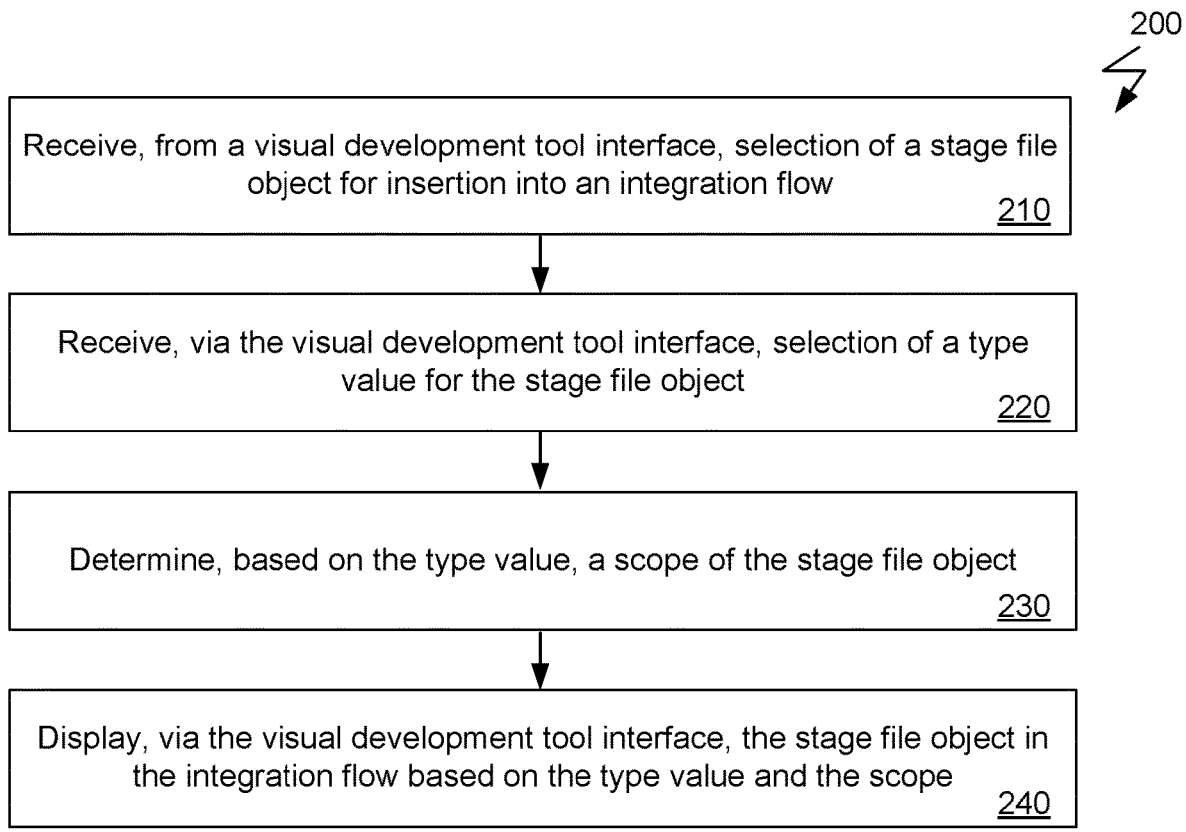
FIGS. 2, 3, and 4 illustrate flow diagrams for providing stage file objects in a visual design tool for integration development according to some example embodiments.

FIG. 2 illustrates a process 200 for providing stage file objects in a visual design tool for integration development. The process 200 can be performed by, for example, integration cloud service system 100 of FIG. 1. The process 200 can begin at 210 with the integration cloud service system receiving, from a visual development tool interface, selection of a stage file object for insertion into an integration flow. For example, a client interface (e.g., client interface 125 of FIG. 1) can receive a selection of a stage file object and provide it to a module (e.g., stage file module 135 of FIG. 1) within a visual design tool (e.g., visual design tool 105 of FIG. 1) for processing.

At 220, the integration cloud service system can receive, via the visual development tool interface, selection of a type value for the stage file object. For example, the type value can be a read, a write, a zip, or a list.

At 230, the integration cloud service system can determine, based on the type value, a scope of the stage file object. For example, if the stage file object defines a stage file read action, the scope of the stage file object can be created to allow other objects to be placed within.

At 240, the integration cloud service system can display, via the visual development tool interface, the stage file object in the integration flow based on the type value and the scope. For example, the display can be similar to stage file object 705 with chunking box 710 of FIG. 7 if the type value is a stage file read and chunking is enabled so the scope is visually depicted. As another example, the display can be similar to stage file object 1002 of FIG. 10A if the type value is stage file read and chunking is disabled. As another example, if the type value is stage file write, the display can be similar to stage file object 1012 of FIG. 10B. As another example, if the type value is stage file zip, the display can be similar to stage file object 1022 of FIG. 10C. As another example, if the type value is stage file list, the display can be similar to stage file object 1032 of FIG. 10D.

Figure 3:
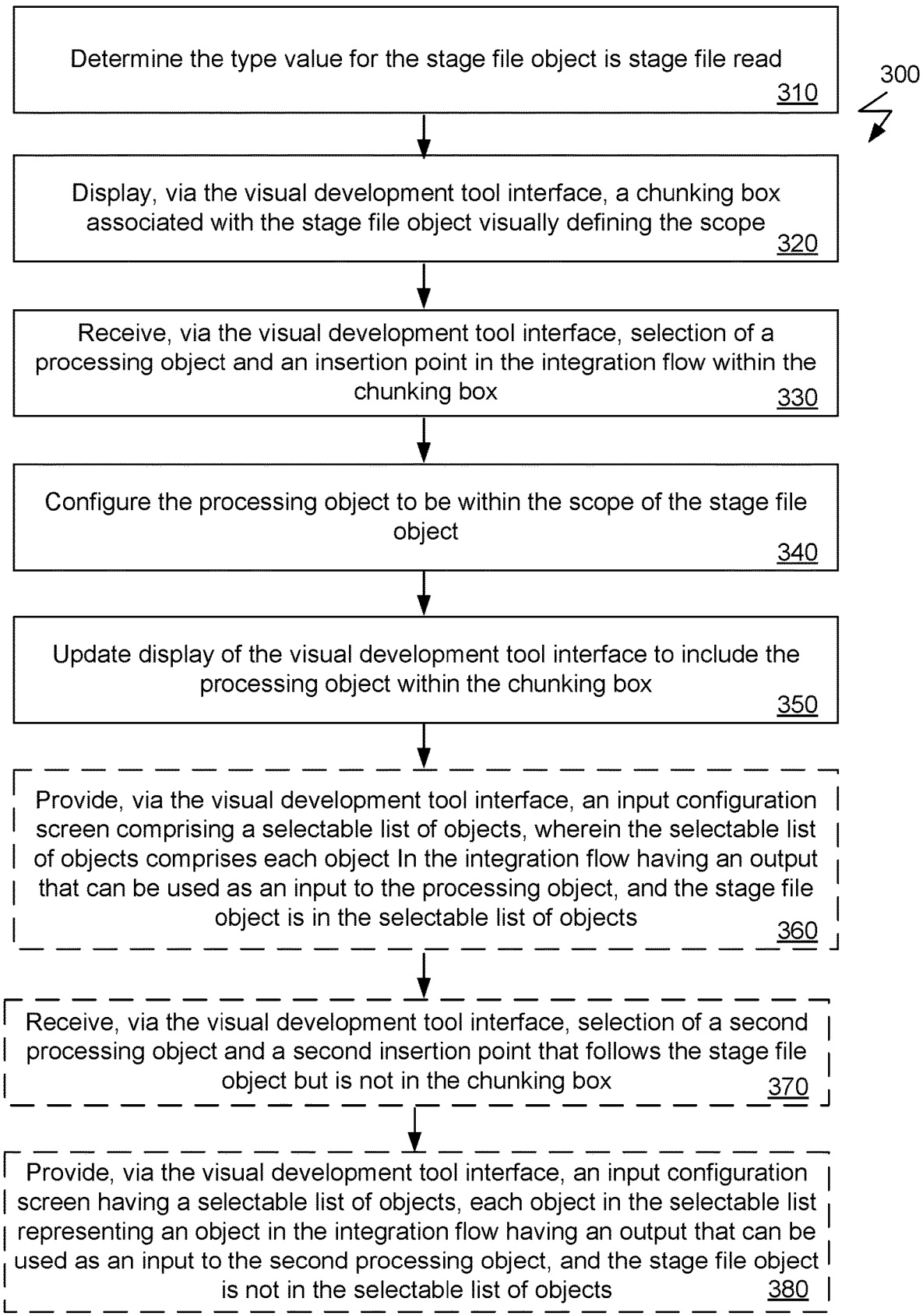

FIG. 3 illustrates an optional process 300 for providing stage file objects in a visual design tool for integration development. Process 300 can optionally be performed with process 200 of FIG. 2. Process 300 can begin at 310 with the integration cloud service system determining the type value for the stage file object is a stage file read. At step 320, the integration cloud service system can display, via the visual development tool interface, a chunking box associated with the stage file object visually defining the scope. For example, stage file object 705 with chunking box 710 of FIG. 7.

At step 330, the integration cloud service can receive, via the visual development tool interface, selection of a processing object and an insertion point in the integration flow within the chunking box. For example, the processing object can be assignment object 815 of FIG. 8.

At step 340, the integration cloud service can configure the processing object to be within the scope of the stage file object. For example, the integration cloud service can configure a selectable list of output options by analyzing the structure of the integration flow to determine which objects can be selected as input objects for the processing object. Configuring the scope can include, for example, configuring the stage file object as an allowable object for selection of the input object to the processing object.

At step 350, the integration cloud service update display of the visual development tool interface to include the processing object within the chunking box. For example, assignment object 815 is within chunking box 810.

At step 360, which is optional, the integration cloud service can provide, via the visual development tool interface, an input configuration screen comprising a selectable list of objects, wherein the selectable list of objects comprises each object In the integration flow having an output that can be used as an input to the processing object, and the stage file object is in the selectable list of objects.

At step 370, which is optional, the integration cloud service can receive, via the visual development tool interface, selection of a second processing object and a second insertion point that follows the stage file object but is not in the chunking box. Because the object is not within chunking box and accordingly outside the scope of the stage file object.

Figure 4:
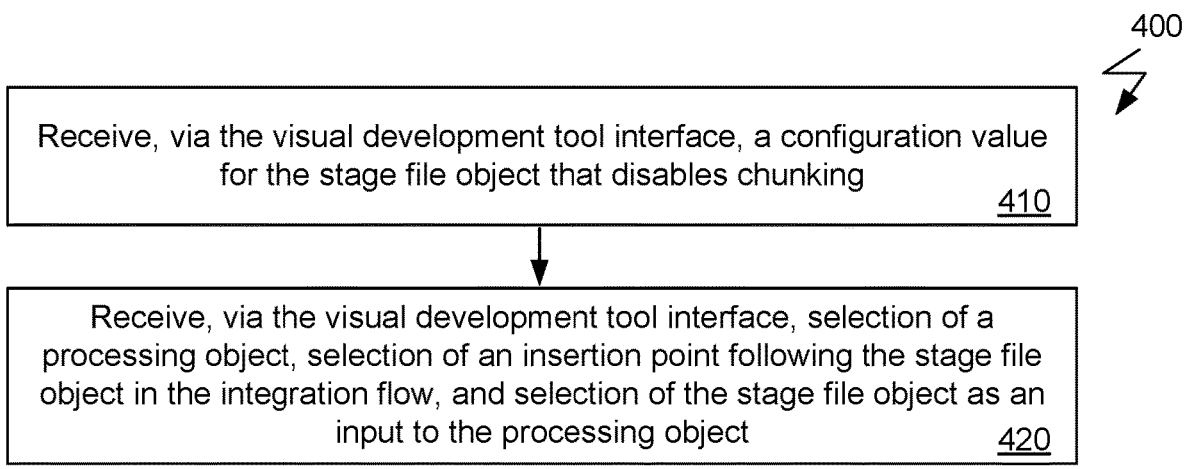

At step 380, which is optional, the integration cloud service can provide, via the visual development tool interface, an input configuration screen having a selectable list of objects, each object in the selectable list representing an object in the integration flow having an output that can be used as an input to the second processing object, and the stage file object is not in the selectable list of objects FIG. 4 illustrates another optional process 400 for providing stage file objects in a visual design tool for integration development. Process 400 can optionally be performed with process 200 of FIG. 2. Process 400 can begin at 410 by the integration cloud service system receiving, via the visual development tool interface, a configuration value for the stage file object that disables chunking. For example, using configuration menu 915 of FIG. 9, the user can disable chunking and the integration cloud service system can receive that configuration setting via the visual design tool interface.

At 420, the integration cloud service system can receive, via the visual development tool interface, selection of a processing object, selection of an insertion point following the stage file object in the integration flow, and selection of the stage file object as an input to the processing object. For example, the assignment object 1004 of FIG. 10A can be dropped into the integration flow. The assignment object 1004 follows the stage file object 1002 in the integration flow. The stage file object 1002 can be configured as the input for the assignment object 1004.

Figure 5:
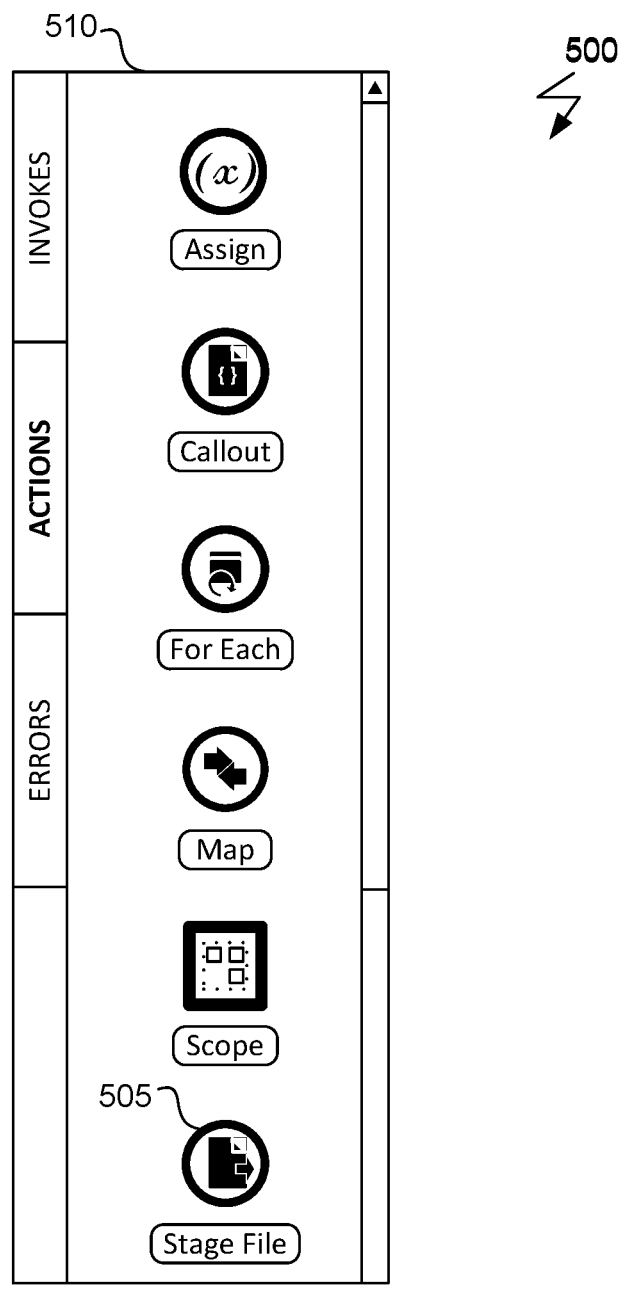
FIG. 5 illustrates a portion of a visual design tool interface including an actions palette according to some example embodiments.

FIG. 5 illustrates a portion of a visual design tool interface 500 including an actions palette 510 according to some example embodiments. The developer can use the actions palette 510 to drag and drop objects into the integration flow. Stage file object 505 is an object the developer can drag and drop into the integration flow.

Figure 6:
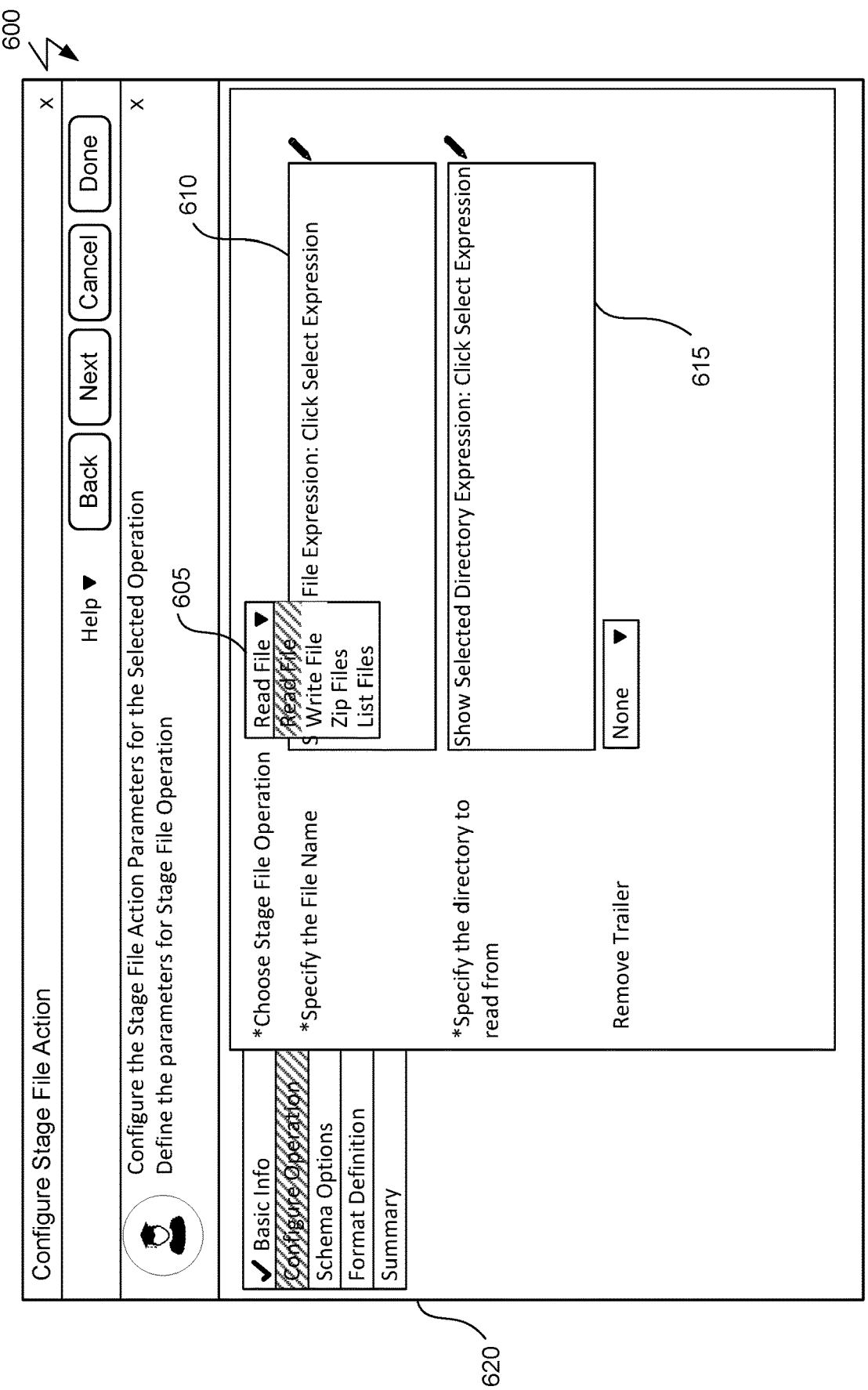
FIG. 6 illustrates a portion of a visual design tool interface including an entry screen for configuring a stage file object according to some example embodiments.

FIG. 6 illustrates a portion of a visual design tool interface 600 comprising a configuration screen 620 for configuring the stage file object 505, in accordance with some example embodiments. Once the stage file object 505 has been dropped into the integration, the configuration screen 620 will be provided through the user interface to the developer for configuring the stage file object 505. The stage file object type can be selected through, for example, a selection box 605. Read File is selected as depicted in selection box 605. Also configurable can be, for example, a file name entered into file name box 610 and a directory entered into directory box 615.

FIG. 7 illustrates a portion of a visual design tool interface 700 including an example integration flow including a stage file object 705 according to some example embodiments. A stage file read action can be defined by Stage file object 705. A stage file read action can involve reading a file that could potentially contain hundreds of thousands of records. When the Stage File Read action is rendered, the visual design tool interface can present the user with an image that indicates that the data read is broken down into multiple datasets (chunks) to be processed by multiple process threads, with datasets being processed in parallel. For example, a file with 100,000 records can be broken down into five 20,000 record datasets. The image for depicting the chunking can be, for example, chunking box 710. Chunking box 710 can indicate that the data read is broken down into multiple datasets. Breaking the data read into multiple datasets can be referred to as 'chunking' in integration could service context.

FIG. 8 illustrates a portion of a visual design tool interface 800 including another example integration flow including a stage file object 805 with chunking enabled according to some example embodiments. As discussed with respect to FIG. 7, large files can be broken down into multiple datasets. Each process thread can perform other actions before all the data sets arrive at the merge point. As shown in FIG. 8, each process thread can perform an assignment action defined by assignment object 815, a mapping action defined by map object 820, and an invoke action defined by invoke object 825. There can be a scope defined between the stage file object 805 and the merge point 830. Specifically, the output of the stage file read action defined by the stage file object 805 can be only available for actions before the merge point 830 (i.e., within chunking box 810). After the merge point 830, output of the stage file read action defined by the stage file object 805 is not visible to the downstream actions (i.e., actions that follow the merge point 830 in the integration flow).

FIG. 9 illustrates a portion of a visual design tool interface 900 including a portion of an integration flow including a stage file object 905 with chunking enabled and a configuration menu 915 according to some example embodiments. After a user drops the stage file object 905 in the integration flow, the user can access a configuration menu 915. As shown in FIG. 9, chunking is enabled and chunking box 910 is displayed. Configuration menu 915 can include a chunking toggle 920, and edit option 930, and a delete option 925. When a mouse hovers over the configuration menu 915, a tool tip 935 can provide information about the selection over which the mouse is hovering. For example, a mouse hovering over chunking toggle 920 can see tool tip 935 that alerts the user that selection of the chunking toggle 920 will disable chunking.

FIG. 10A illustrates a portion of a visual design tool interface 1000 including a portion of an integration flow including a stage file object 1002 with chunking disabled according to some example embodiments. The user can optionally turn off chunking if, for example, the file contains only a limited number of records. With chunking disabled, all the records in the file are read and actions performed in the staged location are processed in a single process thread, which is depicted in FIG. 10A. The stage file object 1002 can serve as input to any of assignment object 1004, map object 1006, or invoke object 1008.

FIG. 10B illustrates a portion of a visual design tool interface 1010 including a portion of an integration flow including a stage file object 1012 that is configured to define a stage file write action. Actions performed in the staged location are processed in a single process thread, which is depicted in FIG. 10B. The stage file object 1012 can serve as input to any of assignment object 1014, map object 1016, or invoke object 1018.

FIG. 10C illustrates a portion of a visual design tool interface 1020 including a portion of an integration flow including a stage file object 1022 that is configured to define a stage file zip action. Actions performed in the staged location are processed in a single process thread, which is depicted in FIG. 10C. The stage file object 1022 can serve as input to any of assignment object 1024, map object 1026, or invoke object 1028.

FIG. 10D illustrates a portion of a visual design tool interface 1030 including a portion of an integration flow including a stage file object 1032 that is configured to define a stage file list action. Actions performed in the staged location are processed in a single process thread, which is depicted in FIG. 10D. The stage file object 1032 can serve as input to any of assignment object 1034, map object 1036, or invoke object 1038.

Figure 11:
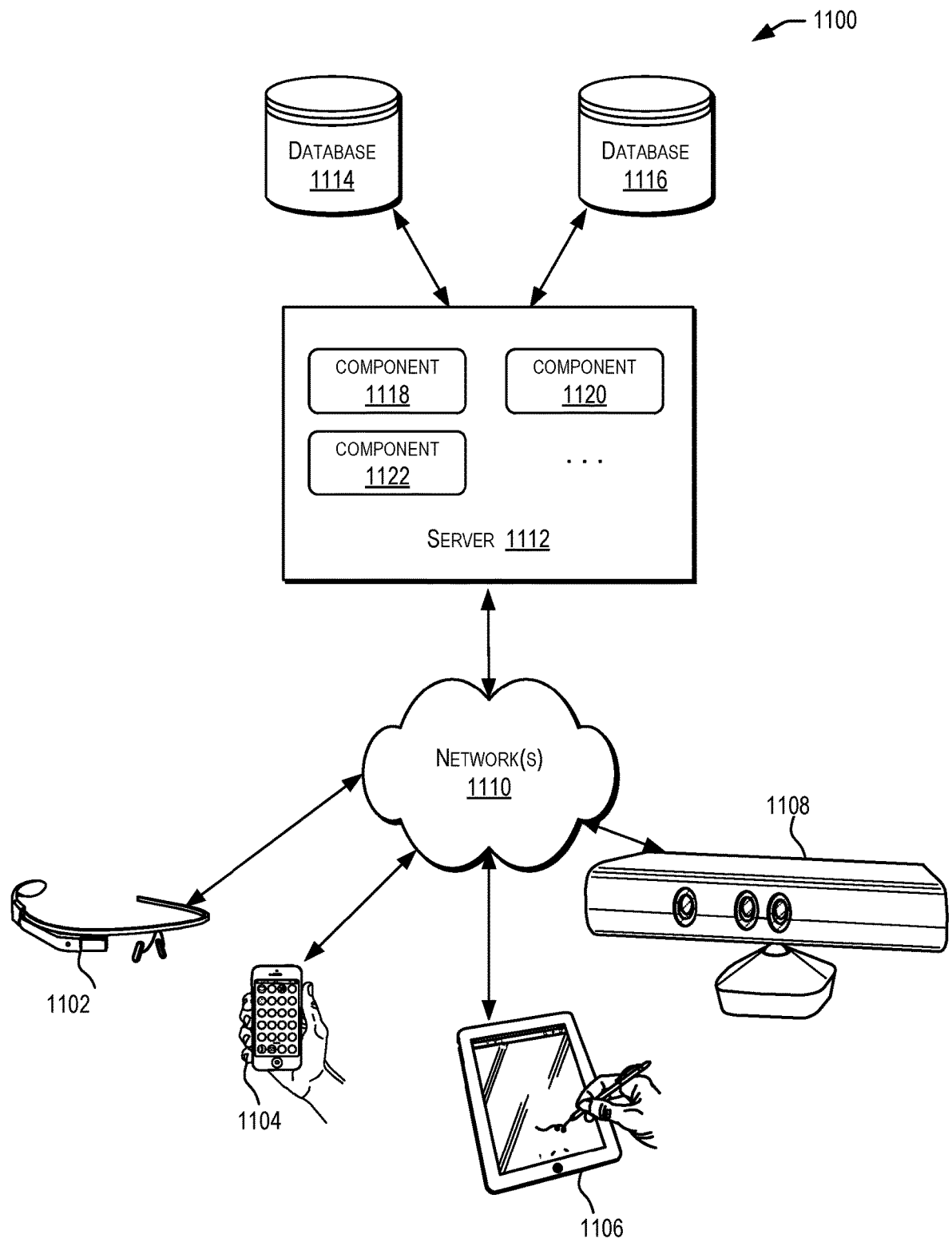
FIG. 11 depicts a simplified diagram of a distributed system according to some example embodiments.
Figure 12:
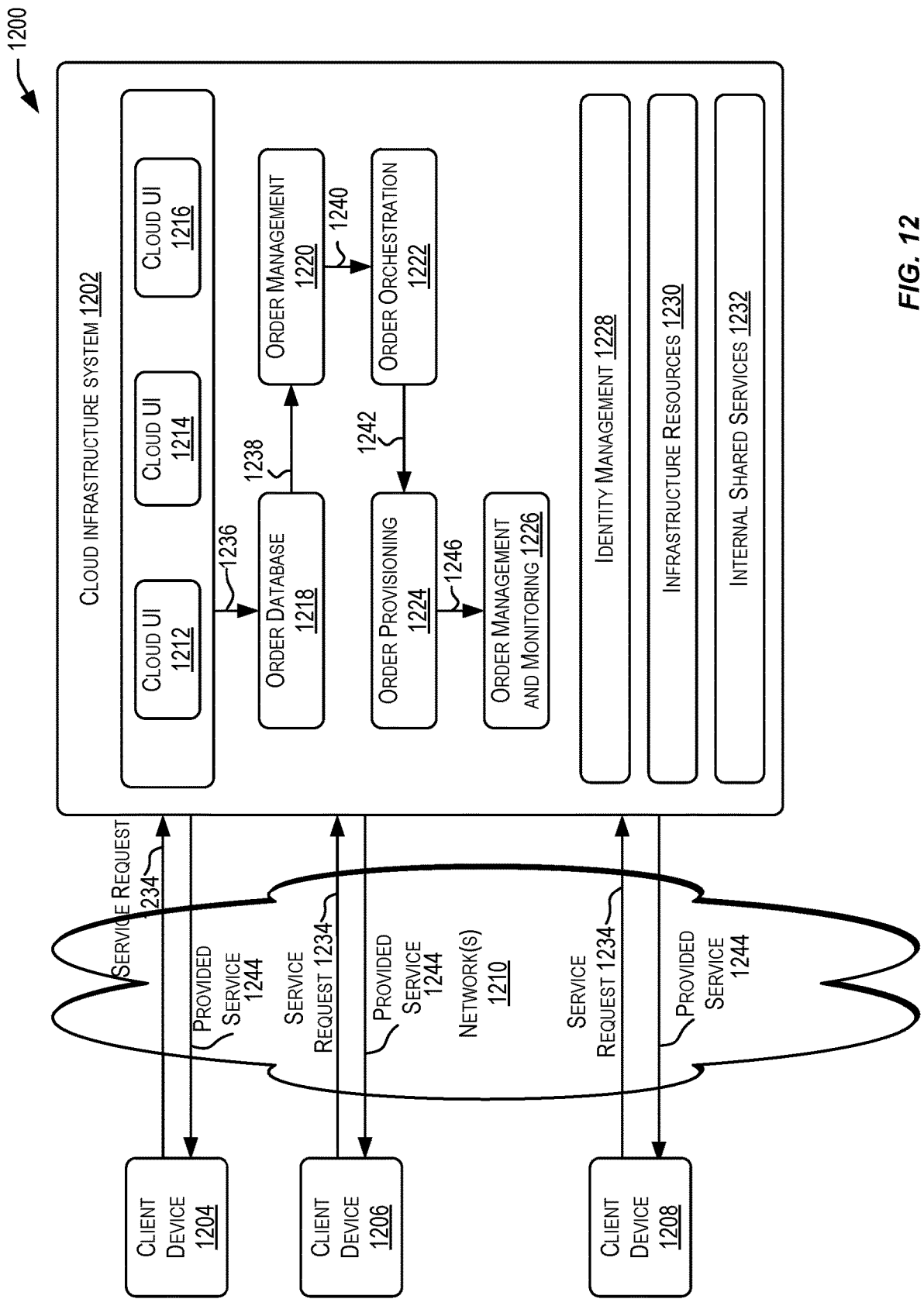
FIG. 12 is a simplified block diagram of one or more components of a system environment in which services may be offered as cloud services according to some example embodiments.

FIGS. 11, 12, and 13 illustrate exemplary hardware and/or software configurations used in various embodiments.

FIG. 11 illustrates a simplified diagram of a distributed system for implementing some example embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications such as services and applications that provide code and/or data for performing controlled availability of objects in the visual development tool executing at the server 1112 or another server. In certain embodiments, server 1112 may also provide other services or software applications that can include non-virtual and virtual environments. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, software components 1118, 1120 and 1122 of system 1100 are shown as being implemented on server 1112. As one example, one or more of the components (e.g., software component 1118) may be the visual development tool discussed throughout the application.

In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

Client computing devices 1102, 1104, 1106, and/or 1108 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1110.

Although distributed system 1100 in FIG. 11 is shown with four client computing devices, any number of client computing devices may be supported. Other devices, such as devices with sensors, etc., may interact with server 1112.

Communication network(s) 1110 in distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 170 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE)

802.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various embodiments, server 1112 may be adapted to run one or more services or software applications described in the foregoing disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1100 may also include one or more databases 1114 and 1116. These databases may provide a mechanism for storing information such as user interactions information, usage patterns information, adaptation rules information, and other information used by example embodiments. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands. However, databases 1114 and 1116 may provide relational databases, object-oriented databases, object-relational databases, NoSQL databases, etc., and may or may not be SQL-based. For example, databases 1114 and/or 1116 may be Oracle Database, PostgreSQL, Microsoft SQL Server, MySQL, MemSQL, Memcached, Redis, MongoDB, BigTable, Cassandra, DB2, Solr, etc.

FIG. 12 is a simplified block diagram of one or more components of a system environment 1200 in which services may be offered as cloud services, in accordance with some embodiments of the present disclosure. In the illustrated embodiment in FIG. 12, system environment 1200 includes one or more client computing devices 1204, 1206, and 1208 that may be used by users to interact with a cloud infrastructure system 1202 that provides cloud services. Additionally, in some embodiments the "client" computing devices 1204, 1206, 1208 may actually be server computers acting as a client in a client-server relationship. Cloud infrastructure system 1202 may comprise one or more computers and/or servers that may include those described above for server 1112.

It should be appreciated that cloud infrastructure system 1202 depicted in FIG. 12 may have other components than those depicted. Further, the embodiment shown in FIG. 12 is one example of a cloud infrastructure system that may incorporate an example embodiment. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108. Client computing devices 1204, 1206, and 1208 may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202. Although exemplary system environment 1200 is shown with three client computing devices, any number of client computing devices may be supported. Other devices such as devices with sensors, etc. may interact with cloud infrastructure system 1202.

Communication network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for communication network(s) 1110.

In certain embodiments, services provided by cloud infrastructure system 1202 may include a host of services that are made available to users of the cloud infrastructure system on demand. In addition to services related to providing code and/or data for performing controlled availability of objects in the visual design tool, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1202 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1202 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle Corporation) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform, and other resources.

In some embodiments, resources in cloud infrastructure system 1202 may be shared by multiple users and dynamically re-allocated per demand. Additionally, resources may be allocated to users in different time zones. For example, cloud infrastructure system 1202 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 to enable provisioning of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1202, and the like.

In one embodiment, as depicted in FIG. 12, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In an exemplary operation, at 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI) such as cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

At 1236, the order information received from the customer may be stored in an order database 1218. If this is a new order, a new record may be created for the order. In one embodiment, order database 1218 can be one of several databases operated by cloud infrastructure system 1218 and operated in conjunction with other system elements.

At 1238, the order information may be forwarded to an order management module 1220 that may be configured to perform billing and accounting functions related to the order, such as verifying the order, and upon verification, booking the order.

At 1240, information regarding the order may be communicated to an order orchestration module 1222 that is configured to orchestrate the provisioning of services and resources for the order placed by the customer. In some instances, order orchestration module 1222 may use the services of order provisioning module 1224 for the provisioning. In certain embodiments, order orchestration module 1222 enables the management of business processes associated with each order and applies business logic to determine whether an order should proceed to provisioning.

As shown in the embodiment depicted in FIG. 12, at 1242, upon receiving an order for a new subscription, order orchestration module 1222 sends a request to order provisioning module 1224 to allocate resources and configure resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. This enables order orchestration module 1222 to be isolated from implementation details, such as whether or not services and resources are actually provisioned on the fly or pre-provisioned and allocated/assigned upon request.

At 1244, once the services and resources are provisioned, a notification may be sent to the subscribing customers indicating that the requested service is now ready for use. In some instance, information (e.g. a link) may be sent to the customer that enables the customer to start using the requested services.

At 1246, a customer's subscription order may be managed and tracked by an order management and monitoring module 1226. In some instances, order management and monitoring module 1226 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1200 may include an identity management module 1228 that is configured to provide identity services, such as access management and authorization services in cloud infrastructure system 1202. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

FIG. 13 illustrates an exemplary computer system 1300 that may be used to implement certain components according to some example embodiments. In some embodiments, computer system 1300 may be used to implement any of the various servers and computer systems described above. As shown in FIG. 13, computer system 1300 includes various subsystems including a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 may include tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1304 controls the operation of computer system 1300 and may comprise one or more processing units 1332, 1334, etc. A processing unit may include be one or more processors, including single core or multicore processors, one or more cores of processors, or combinations thereof. In some embodiments, processing subsystem 1304 can include one or more special purpose co-processors such as graphics processors (GPUs), digital signal processors (DSPs), or the like. In some embodiments, some or all of the processing units of processing subsystem 1304 can be implemented using customized circuits, such as application specific integrated circuits (ASICs), or field programmable gate arrays (FPGAs).

In some embodiments, the processing units in processing subsystem 1304 can execute instructions stored in system memory 1310 or on computer readable storage media 1322. In various embodiments, the processing units can execute a variety of programs or code instructions and can maintain multiple concurrently executing programs or processes. At any given time, some or all of the program code to be executed can be resident in system memory 1310 and/or on computer-readable storage media 1322 including potentially on one or more storage devices. Through suitable programming, processing subsystem 1304 can provide various functionalities described above for performing efficient application configuration patching operations.

In certain embodiments, a processing acceleration unit 1306 may be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term "input device" is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information that is used by computer system 1300. Storage subsystem 1318 provides a tangible non-transitory computer-readable storage medium for storing the basic programming and data constructs that provide the functionality of some embodiments. Software (programs, code modules, instructions) that when executed by processing subsystem 1304 provide the functionality described above may be stored in storage subsystem 1318. The software may be executed by one or more processing units of processing subsystem 1304. Storage subsystem 1318 may also provide a repository for storing data used in accordance with the some example embodiments.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM) or dynamic random access memory (DRAM).

By way of example, and not limitation, as depicted in FIG. 13, system memory 1310 may store application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1322 may store programming and data constructs that provide the functionality of some embodiments. Software (programs, code modules, instructions) that when executed by processing subsystem 1304 a processor provide the functionality described above may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1322 may provide storage of computer-readable instructions, data structures, program modules, and other data for computer system 1300.

In certain embodiments, storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for storing computer-readable information.

In certain embodiments, computer system 1300 may provide support for executing one or more virtual machines. Computer system 1300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1300. Accordingly, multiple operating systems may potentially be run concurrently by computer system 1300. Each virtual machine generally runs independently of the other virtual machines.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices.

Communication subsystem 1324 may support both wired and/or wireless communication protocols. For example, in certain embodiments, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

Communication subsystem 1324 can receive and transmit data in various forms. For example, in some embodiments, communications subsystem 1324 may receive input communication in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments.

Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method, comprising:
   providing, by a computer system, a visual development tool interface comprising a graphical representation of a configurable stage file object, wherein the configurable stage file object defines a stage file action comprising a type value and scope, and wherein the stage file action is used to perform an action of the type value on a file during runtime;
   receiving, at the computer system via the visual development tool interface, selection of the configurable stage file object for insertion into an integration flow as a configured stage file object, wherein selection of the configurable stage file object comprises a drag and drop action;
   receiving, at the computer system via the visual development tool interface, selection of the type value for the configured stage file object;
   determining, by the computer system, based on the type value, a scope of the configured stage file object; and
   displaying, by the computer system via the visual development tool interface, the configured stage file object in the integration flow based on the type value and the scope, wherein the integration flow comprises representative graphical representations for each object in the integration flow connected by directional arrows representing a flow of data.

2. The method of claim 1, wherein the type value defines the configured stage file object as a stage file read action, the method further comprising:
   displaying, by the computer system via the visual development tool interface, a chunking box associated with the configured stage file object visually defining the scope;
   receiving, by the computer system via the visual development tool interface, selection of a processing object and an insertion point in the integration flow, wherein the insertion point is within the chunking box;
   configuring, by the computer system, the processing object to be within the scope of the configured stage file object; and
   updating, by the computer system, display of the visual development tool interface to include the processing object within the chunking box.

3. The method of claim 2, further comprising:
   providing, by the computer system via the visual development tool interface, an input configuration screen comprising a selectable list of objects, wherein the selectable list of objects comprises each object in the integration flow having an output that can be used as an input to the processing object, wherein the configured stage file object is in the selectable list of objects.

4. The method of claim 2, further comprising:
   receiving, by the computer system via the visual development tool interface, selection of a second processing object and a second insertion point, wherein the second insertion point follows a location of the configured stage file object in the integration flow and is not within the scope of the chunking box; and
   providing, by the computer system via the visual development tool interface, an input configuration screen comprising a selectable list of objects, wherein the selectable list of objects comprises each object in the integration flow having an output that can be used as an input to the second processing object, wherein the configured stage file object is not in the selectable list of objects.

5. The method of claim 1, wherein the type value defines the configured stage file object as a stage file read action, the method further comprising:
   receiving, by the computer system via the visual development tool interface, a configuration value for the configured stage file object that disables chunking; and
   receiving, by the computer system via the visual development tool interface, selection of a processing object, selection of an insertion point following the configured stage file object in the integration flow, and selection of the configured stage file object as an input to the processing object.

6. The method of claim 1, wherein the configured stage file object is a stage file write action, the method further comprising:
   receiving, by the computer system via the visual development tool interface, selection of a processing object, selection of an insertion point following the configured stage file object in the integration flow, and selection of the configured stage file object as an input to the processing object.

7. The method of claim 1, wherein the configured stage file object is a stage file zip action, the method further comprising:
   receiving, by the computer system via the visual development tool interface, selection of a processing object, selection of an insertion point following the configured stage file object in the integration flow, and selection of the configured stage file object as an input to the processing object.

8. The method of claim 1, wherein the configured stage file object is a stage file list action, the method further comprising:
receiving, by the computer system via the visual development tool interface, selection of a processing object, selection of an insertion point following the configured stage file object in the integration flow, and selection of the configured stage file object as an input to the processing object.

9. A cloud based integration service comprising:
one or more processors; and
a memory having stored thereon instructions that, upon execution by the one or more processors cause the one or more processors to:
provide, to a client device, a visual development tool interface comprising a graphical representation of a configurable stage file object, wherein the configurable stage file object defines a stage file action comprising a type value and scope, and wherein the stage file action is used to perform an action of the type value on a file during runtime;
receive, via the visual development tool interface, selection of the configurable stage file object for insertion into an integration flow as a configured stage file object, wherein selection of the configurable stage file object comprises a drag and drop action;
receive, via the visual development tool interface, selection of the type value for the configured stage file object;
determine, based on the type value, a scope of the configured stage file object; and
display, via the visual development tool interface, the configured stage file object in the integration flow based on the type value and the scope, wherein the integration flow comprises representative graphical representations for each object in the integration flow connected by directional arrows representing a flow of data.

10. The cloud based integration service of claim 9, wherein the type value defines the configured stage file object as a stage file read action, wherein the instructions comprise further instructions that, upon execution by the one or more processors cause the one or more processors to:
display, via the visual development tool interface, a chunking box associated with the configured stage file object visually defining the scope;
receive, via the visual development tool interface, selection of a processing object and an insertion point in the integration flow, wherein the insertion point is within the chunking box;
configure the processing object to be within the scope of the configured stage file object; and
update display of the visual development tool interface to include the processing object within the chunking box.

11. The cloud based integration service of claim 10, wherein the instructions comprise further instructions that, upon execution by the one or more processors cause the one or more processors to:
provide, via the visual development tool interface, an input configuration screen comprising a selectable list of objects, wherein the selectable list of objects comprises each object in the integration flow having an output that can be used as an input to the processing object, wherein the configured stage file object is in the selectable list of objects.

12. The cloud based integration service of claim 10, wherein the instructions comprise further instructions that, upon execution by the one or more processors cause the one or more processors to:
receive, via the visual development tool interface, selection of a second processing object and a second insertion point, wherein the second insertion point follows a location of the configured stage file object in the integration flow and is not within the scope of the chunking box; and
provide, via the visual development tool interface, an input configuration screen comprising a selectable list of objects, wherein the selectable list of objects comprises each object in the integration flow having an output that can be used as an input to the second processing object, wherein the configured stage file object is not in the selectable list of objects.

13. The cloud based integration service of claim 9, wherein the type value defines the configured stage file object as a stage file read action, wherein the instructions comprise further instructions that, upon execution by the one or more processors cause the one or more processors to:
receive, via the visual development tool interface, a configuration value for the configured stage file object that disables chunking; and
receive, via the visual development tool interface, selection of a processing object, selection of an insertion point following the configured stage file object in the integration flow, and selection of the configured stage file object as an input to the processing object.

14. The cloud based integration service of claim 9, wherein:
the configured stage file object is a stage file write action; and
the instructions comprise further instructions that, upon execution by the one or more processors, cause the one or more processors to receive, via the visual development tool interface, selection of a processing object, selection of an insertion point following the configured stage file object in the integration flow, and selection of the configured stage file object as an input to the processing object.

15. The cloud based integration service of claim 9, wherein:
the configured stage file object is a stage file zip action; and
the instructions comprise further instructions that, upon execution by the one or more processors, cause the one or more processors to receive receiving, via the visual development tool interface, selection of a processing object, selection of an insertion point following the configured stage file object in the integration flow, and selection of the configured stage file object as an input to the processing object.

16. The cloud based integration service of claim 9, wherein:
The configured stage file object is a stage file list action; and
the instructions comprise further instructions that, upon execution by the one or more processors, cause the one or more processors to receive, via the visual development tool interface, selection of a processing object, selection of an insertion point following the configured stage file object in the integration flow, and selection of the configured stage file object as an input to the processing object.

17. A computer readable memory device having stored thereon instructions that, upon execution by one or more processors, cause the one or more processors to:
- provide, to a client device, a visual development tool interface comprising a graphical representation of a configurable stage file object, wherein the configurable stage file object defines a stage file action comprising a type value and scope, and wherein the stage file action is used to perform an action of the type value on a file during runtime;
- receive, via the visual development tool interface, selection of the configurable stage file object for insertion into an integration flow as a configured stage file object, wherein selection of the configurable stage file object comprises a drag and drop action;
- receive, via the visual development tool interface, selection of the type value for the configured stage file object;
- determine, based on the type value, a scope of the configured stage file object; and
- display, via the visual development tool interface, the configured stage file object in the integration flow based on the type value and the scope, wherein the integration flow comprises representative graphical representations for each object in the integration flow connected by directional arrows representing a flow of data.

18. The computer readable memory device of claim 17, wherein the type value defines the configured stage file object as a stage file read action, wherein the instructions comprise further instructions that, upon execution by the one or more processors cause the one or more processors to:
- display, via the visual development tool interface, a chunking box associated with the configured stage file object visually defining the scope;
- receive, via the visual development tool interface, selection of a processing object and an insertion point in the integration flow, wherein the insertion point is within the chunking box;
- configure the processing object to be within the scope of the configured stage file object; and
- update display of the visual development tool interface to include the processing object within the chunking box.

19. The computer readable memory device of claim 17, wherein the instructions comprise further instructions that, upon execution by the one or more processors cause the one or more processors to:
- receive, via the visual development tool interface, selection of a second processing object and a second insertion point, wherein the second insertion point follows a location of the configured stage file object in the integration flow; and
- provide, via the visual development tool interface, an input configuration screen comprising a selectable list of objects, wherein the selectable list of objects comprises each object in the integration flow having an output that can be used as an input to the second processing object, wherein the configured stage file object is not in the selectable list of objects.

20. The computer readable memory device of claim 17, wherein the instructions comprise further instructions that, upon execution by the one or more processors cause the one or more processors to:
- receive, via the visual development tool interface, a configuration value for the configured stage file object that disables chunking; and
- receive, via the visual development tool interface, selection of a processing object, selection of an insertion point following the configured stage file object in the integration flow, and selection of the configured stage file object as an input to the processing object.

* * * * *

UNITED STATES PATENT AND TRADEMARK OFFICE
CERTIFICATE OF CORRECTION

PATENT NO. : 10,789,050 B2  
APPLICATION NO. : 15/706284  
DATED : September 29, 2020  
INVENTOR(S) : Kendai et al.

It is certified that error appears in the above-identified patent and that said Letters Patent is hereby corrected as shown below:

In the Drawings

On sheet 3 of 16, in FIG. 3, under Reference Numeral 360, Line 3, delete "In" and insert -- in --, therefor.

In the Specification

In Column 9, Line 52, delete "objects" and insert -- objects. --, therefor.

In Column 14, Line 24, delete "etc." and insert -- etc., --, therefor.

In the Claims

In Column 26, Line 50, in Claim 15, delete "receive receiving," and insert -- receive, --, therefor.

In Column 26, Line 58, in Claim 16, delete "The" and insert -- the --, therefor.

In Column 27, Line 33, in Claim 18, delete "processors" and insert -- processors, --, therefor.

In Column 28, Line 11, in Claim 19, delete "processors" and insert -- processors, --, therefor.

In Column 28, Line 26, in Claim 20, delete "processors" and insert -- processors, --, therefor.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*